July 7, 1925.  1,545,353

F. ROSELL ET AL

BOTTLE AND METHOD OF MANUFACTURING THE SAME

Filed April 7, 1924

Inventors.

Fernando Rosell and Apolonia Benetti by Connolly Bros
Attorneys

Patented July 7, 1925.

1,545,353

UNITED STATES PATENT OFFICE.

FERNANDO ROSELL AND APOLONIA BENETTI, OF BARCELONA, SPAIN.

BOTTLE AND METHOD OF MANUFACTURING THE SAME.

Application filed April 7, 1924. Serial No. 704,735.

*To all whom it may concern:*

Be it known that FERNANDO ROSELL and APOLONIA BENETTI, subjects of the Kings of Spain and Italy, respectively, residing at Diputacion 298 entresuelo, and Marques del Duero 82, respectively, Barcelona, have invented certain new and useful Improvements in Bottles and Methods of Manufacturing the Same, of which the following is a specification, reference being had therein to the accompanying drawing.

The present invention has for its object a process of manufacture of bottles or flasks with bodies sub-divided into two, or a greater number of, sections, the edges of which engage one with another in such a way that once put together they form all together a complete bottle body, and offer at the same time, by a mere disengagement, great accessibility, thus remarkably facilitating the careful and efficacious cleaning of the bottle.

The process consists essentially in manufacturing in the first place a bottle or flask complete in one piece, but presenting on its exterior surface, circumferentially, or following transverse sections, one or more depressions forming annular grooves of greater or less breadth, according as to whether it is required to give greater or less height, in other words more or less available contact surface, to the edge with which one section engages with the section next to it.

The bottles or flasks manufactured in this way, that is to say having these annular grooves, are then cut along one of the outlines limiting the breadth of each of the aforesaid grooves. One of the sections obtained by this cutting will then present an edge equal in diameter to that of the body of the bottle or flask where there are no annular grooves, while the other section will present an edge of less diameter and equal to that of the bed of the aforesaid annular grooves. In this way each of these two sections can engage with the other by the introduction of the edge of lesser diameter into the opening of greater diameter of the other, the height of the engaging surface will be equal to the breadth the annular groove had before cutting. As may be supposed, these mutually engaging edges of the sections thus cut should be subjected to a polishing process so as to remove any burrs or superfluities which might be prejudicial to their fitting well together or even prevent it altogether.

To ensure a perfect watertight contact, that is to say, to make them fit hermetically, the engaging surface of the sections of the bottle may with advantage be subjected to the action of emery.

In this way sectionable bottles or flasks will be obtained whose sections will be capable of mutual engagement one with another just like glass stoppers in bottles which have been treated with emery, that is to say without any threads or internal joint of any kind whatever, and a perfect closure will thus be secured.

The attached design gives an example of the phases of manufacture of a sectionable bottle according to this invention, composed of two separate parts capable of engaging one with another.

In the drawing—

Figure 1:
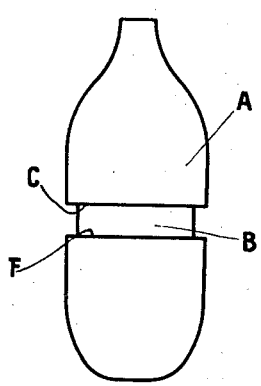
Fig. 1 shows the first stage of manufacture.
Figure 2:
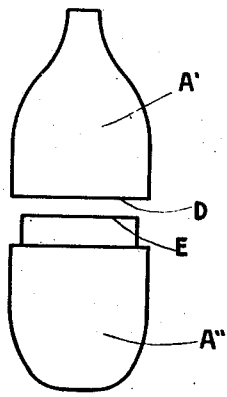
Fig. 2 shows the two separate sections.
Figure 3:
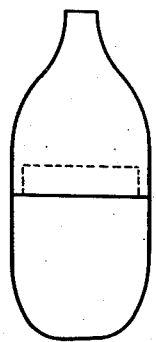
Fig. 3 shows the two sections in telescoping relation.

Figure 1 shows the first stage of the manufacture, the bottle is supposed to be of blown glass. In the portion A constituting its body a depression or annular groove is formed B. The bottle is then cut circumferentially along the circumference C, this gives rise to two sections A' and A'' as shown in Fig. 2, the section A' presents a cut edge D of greater diameter than the cut edge E of the other section A''. The section A'' can thus engage in the section A' as shown in Figure 3.

Figure 4:
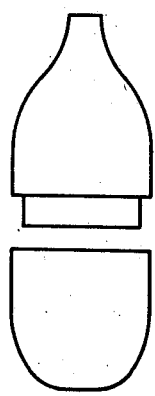
Fig. 4 shows the bottle cut at the lower circumferential contour.
Figure 5:
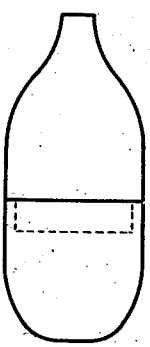
Fig. 5 shows the sections of Fig. 4 in telescoping relation.

The body of the bottle can just as well be cut by following the circumferential contour F (Fig. 1), the two sections to engage then appear as shown in Figure 4, and engage as in Figure 5.

As already said a bottle of this kind can be made just as well with two as with a greater number of engaging sections.

Figure 6:
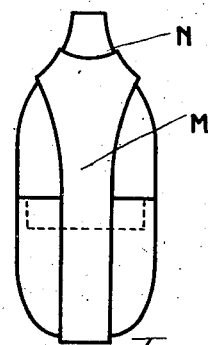
Fig. 6 shows the sections held together by means of a rubber band.

These bottles may be of varied shapes. They are particularly suitable for feeding bottles, but they may be equally well adapted to many other uses. It will always be possible to fix between their adjoining sections some safety arrangment, such as a rubber ring M (Figure 6), having an opening N for the passage of the neck of the bottle.

Claims:

1. Process of manufacture of bottles with sub-divided bodies, consisting essentially in arranging in the body one or more transverse depressions forming annular grooves, and then cutting along the outline corresponding to one of the boundary lines of such grooves, so that of the two sections thus obtained one will have a diameter greater than that of the other, and thus permit of their watertight engagement, the breadth of the engaging surface being equal to that of the said groove the several sections being coupled together to form a bottle having water tight joints between the sections.

2. A bottle composed of a plurality of circumferentially coinciding separable sections having telescopic joint connections.

3. A blank for the manufacture of bottles consisting of a one piece hollow, blown vessel, having one or more circumferential flat grooves, and adapted to be divided through the wall of the narrowest portion of the grooves to produce separate telescopic sections.

In testimony whereof we hereunto affix our signatures.

FERNANDO ROSELL.
APOLONIA BENETTI.